(12) United States Patent
Wobben (10) Patent No.: US 7,432,610 B2
(45) Date of Patent: Oct. 7, 2008

(54) WIND POWER INSTALLATION WITH RING GENERATOR HAVING A STATOR WITH GROVES TO RECEIVE A STATOR WINDING

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/485,429

(22) PCT Filed: Jun. 26, 2002

(86) PCT No.: PCT/EP02/07045

§ 371 (c)(1),
(2), (4) Date: Sep. 13, 2004

(87) PCT Pub. No.: WO03/012292

PCT Pub. Date: Feb. 13, 2003

(65) Prior Publication Data

US 2005/0042097 A1   Feb. 24, 2005

(30) Foreign Application Priority Data

Jul. 31, 2001   (DE) ............................... 101 37 270
Sep. 13, 2001  (DE) ............................... 101 45 018

(51) Int. Cl.
*F03D 9/00* (2006.01)
(52) U.S. Cl. ..................... 290/44; 290/55; 310/179
(58) Field of Classification Search ............. 290/44, 290/55
See application file for complete search history.

(56) References Cited

U.S. PATENT DOCUMENTS

| | | | | |
|---|---|---|---|---|
| 2,240,262 A | * | 4/1941 | Hermann | ............... 307/151 |
| 3,044,150 A | | 7/1962 | Higley | ............... 29/155.5 |
| 3,793,694 A | | 2/1974 | Norkaitis | ............... 29/205 R |
| 3,979,618 A | | 9/1976 | Auinger | ............... 310/198 |
| 4,131,988 A | | 1/1979 | Finegold | ............... 29/596 |
| 4,217,510 A | | 8/1980 | Detinko et al. | |
| 4,318,019 A | * | 3/1982 | Teasley et al. | ............... 310/156.35 |
| 4,402,129 A | * | 9/1983 | Kreuzer et al. | ............... 29/596 |
| 4,469,973 A | | 9/1984 | Guyot et al. | |

(Continued)

FOREIGN PATENT DOCUMENTS

AU   25872/88   6/1989

(Continued)

OTHER PUBLICATIONS

Hegner, et al., "Parameter Measurement of a Six-Phase Synchronous Machine for Simulation of Machine/Converter Systems," in *Proceedings of the 31st Intersociety Energy Conversion Engineering Conference*, Aug. 11-16, 1996, vol. 3, pp. 1792-1797.

(Continued)

*Primary Examiner*—Joseph Waks
(74) *Attorney, Agent, or Firm*—Seed IP Law Group PLLC (57) ABSTRACT

A wind power installation has a (ring) generator which has a stator in which grooves are provided at the inner or outer periphery in mutually spaced relationship to receive a stator winding. In order to provide a stator having a winding, in which the susceptibility to trouble as a consequence of the high loading on the generator is substantially reduced, the stator winding is wound without interruption continuously throughout.

18 Claims, 7 Drawing Sheets

U.S. PATENT DOCUMENTS

| | | | | |
|---|---|---|---|---|
| 4,563,606 | A | 1/1986 | Fukasawa et al. | 310/208 |
| 4,588,143 | A | 5/1986 | Hetzel | |
| 4,672,252 | A | 6/1987 | Spirk | |
| 4,720,640 | A * | 1/1988 | Anderson et al. | 290/43 |
| 5,025,997 | A | 6/1991 | Shi et al. | |
| 5,062,200 | A | 11/1991 | Lanfranco | |
| 5,315,159 | A * | 5/1994 | Gribnau | 290/55 |
| 5,844,341 | A * | 12/1998 | Spooner et al. | 310/112 |
| 5,881,778 | A | 3/1999 | Barrera | |
| 6,223,784 | B1 | 5/2001 | Kirschner | 140/92.2 |
| 6,326,713 | B1 * | 12/2001 | Judson | 310/112 |
| 6,441,526 | B1 | 8/2002 | Oohashi et al. | |
| 6,504,283 | B1 | 1/2003 | Asao et al. | |
| 6,525,504 | B1 * | 2/2003 | Nygren et al. | 318/700 |
| 6,739,034 | B2 | 5/2004 | Suzuki et al. | |
| 6,781,276 | B1 * | 8/2004 | Stiesdal et al. | 310/254 |
| 6,836,047 | B1 * | 12/2004 | Leijon | 310/198 |
| 6,917,272 | B2 | 7/2005 | Valdemarsson | |
| 7,009,320 | B2 | 3/2006 | Akita et al. | |
| 7,061,133 | B1 * | 6/2006 | Leijon et al. | 290/44 |
| 7,152,306 | B2 | 12/2006 | Andersson et al. | |
| 7,268,455 | B2 | 9/2007 | Kouda et al. | |
| 2002/0047268 | A1 | 4/2002 | Leijon et al. | 290/7 |
| 2002/0047443 | A1* | 4/2002 | Heyden et al. | 310/179 |
| 2002/0117912 | A1 | 8/2002 | Kusase et al. | |
| 2005/0046297 | A1 | 3/2005 | Chen et al. | |
| 2006/0033394 | A1 | 2/2006 | Ogawa et al. | |
| 2006/0232156 | A1* | 10/2006 | Wobben | 310/179 |

FOREIGN PATENT DOCUMENTS

| | | | |
|---|---|---|---|
| CA | 2256347 | | 12/1997 |
| DE | 319567 | | 3/1920 |
| DE | 3638129 | A1 * | 5/1988 |
| DE | 39 23 310 | C1 | 11/1990 |
| DE | 199 61 760 | A1 | 7/2001 |
| DE | 19961760 | | 7/2001 |
| EP | 0 030 357 | | 6/1981 |
| EP | 0030357 | | 6/1981 |
| EP | 0 058 352 | | 8/1982 |
| EP | 0058352 | | 8/1982 |
| EP | 0 504 093 | A1 | 9/1992 |
| EP | 1 049 237 | A2 | 11/2000 |
| GB | 2 149 595 | A | 6/1985 |
| GB | 2331858 | A * | 6/1999 |
| GB | 2 339 975 | A | 2/2000 |
| JP | 59-189469 | | 12/1984 |
| JP | 3270664 | | 12/1991 |
| JP | 10-150748 | A | 6/1998 |
| JP | 11-18331 | | 1/1999 |
| JP | 2001-054264 | A | 2/2001 |
| JP | 2001314054 | | 11/2001 |
| JP | 2001339891 | | 12/2001 |
| WO | 98/34331 | A1 | 8/1998 |
| WO | 99/29016 | A1 | 6/1999 |
| WO | 99/31520 | A1 | 6/1999 |
| WO | WO 0073652 | A1 * | 12/2000 |
| WO | WO 02/065623 | A1 | 8/2002 |
| WO | WO 0074198 | A1 * | 12/2002 |

OTHER PUBLICATIONS

Spooner et al., "Direct coupled, permanent magnet generators for wind turbine applications," *IEE Proceedings*, Online No. 19960099, 1994.

* cited by examiner

WIND POWER INSTALLATION WITH RING GENERATOR HAVING A STATOR WITH GROVES TO RECEIVE A STATOR WINDING

BACKGROUND OF THE INVENTION

1. Field of the Invention

The present invention concerns a wind power installation having a generator which has a stator in which grooves are provided at the inner or outer periphery in mutually spaced relationship to receive a stator winding. Such wind power installations are known and are produced and marketed for example by ENERCON.

2. Description of the Related Art

A known process for the production of stator windings in generators includes the use of what are referred to as former-wound coils. Those former-wound coils are individual windings of the stator winding, which are already adapted in respect of their form to the grooves and groove spacings of the stator and which are firstly individually inserted into the grooves and then connected together.

It will be appreciated however that wind power installations are always exposed to high levels of loading during operation thereof. With an increasing wind speed the power output of the wind power installation increases but at the same time the mechanical loading also rises. That means that the stress on the wind power installation increases substantially simultaneously, from the mechanical and the electrical point of view. At high wind speeds the mechanical stress on the installation is high and at the same time a great deal of electrical power is generated so that the stress on the electrical components is also high.

In that situation, the generator of the wind power installation, which is subjected to mechanical and electrical stresses, is particularly stressed. That combination gives rise to problems if for example, as a consequence of high electric currents generated, the temperature in the region of the generator is also high and, as a consequence of mechanical stress, connections between individual components are subjected to the effect of vibration. If thermal expansion also gives rise to a small amount of play or a loosening effect, the mechanical loadings can here result in a defect or even damage.

If that trouble involves the stator winding or a phase thereof, at least that phase is out of commission in terms of energy production. Furthermore this involves an additional asymmetrical loading in the generator as, as a consequence of the interruption, that phase acts as in the no-load mode of operation. In that respect mechanical damage due to released and freely movable components such as connecting sleeves is not even taken into consideration.

In the case of a stator, wound in six-phase configuration, of a generator with 72 poles, there are 432 former-wound coils which are connected together by 864 connecting locations. Those connecting locations are usually in the form of screw, clamping or solder connections.

Having regard to statistical probabilities (of no matter how small magnitude), the high number of connecting locations and the permanent changes in load mean that, even if the connection between the former-wound coils is carefully made, this involves a serious source of trouble. In that respect only one stator is taken into account in the foregoing considerations. The aspect of mass production clearly reveals the actual probability of such a problem occurring.

BRIEF SUMMARY OF THE INVENTION

Therefore one object of the present invention is to provide a stator having a winding, in which the above-discussed problems are substantially reduced.

In a wind power installation of the kind set forth in the opening part of this specification, that object is attained by a stator winding which is of a continuous nature throughout. That arrangement avoids in particular the need for a connector between individual portions of a stator winding.

In a preferred embodiment of the invention all phases are respectively wound continuously throughout on the stator.

In order to be able to compensate for current-displacement effects in the individual turns, the turns are produced from at least two conductor bundles, wherein a plurality of mutually insulated conductors is present in each conductor bundle. Those conductor bundles are introduced into grooves in the stator in a predetermined sequence and the sequence is altered at also predetermined spacings so that each of the conductor bundles is alternately affected as uniformly as possible by those effects. It is possible to forego compensation measures by virtue of that uniform influence in respect of all conductor bundles of a phase.

In order to facilitate handling of the stator during production of the winding and to provide a situation which is favorable in work-physiological terms, the stator is kept in a mounting apparatus in which the grooves are at a favorable working height for production of the winding and which permits rotation of the stator in the peripheral direction by a desired amount. This can preferably be effected using a motor drive.

In a particularly preferred development of the invention there is further provided at least one carrier apparatus for carrying at least one coil with winding wire. That carrier apparatus makes it possible to handle the winding wire, for example in the form of conductor bundles, the length of which, in accordance with the invention, is such that the phase can be wound continuously throughout on the stator. The conductor bundle length required for that purpose results in a considerable weight which can no longer be handled manually.

In a particularly preferred embodiment two respective drums with winding wire are handled in pairs in order in that way to be able to handle both conductor bundles at the same time and a carrier apparatus carries three pairs of the drums with winding wire so that, using such a carrier apparatus, a three-phase system with two respective conductor bundles per phase can be wound on the stator.

In a particularly preferred development of the invention the drums with the winding wire are arranged pivotably about a central axis of rotation of the carrier apparatus. That arrangement makes it possible to compensate for twisting of the conductor bundles, which arises out of the rotation of the stator in the holding apparatus, by virtue of the drums being correspondingly rotationally entrained on the carrier apparatuses.

Further advantageous embodiments of the invention are set forth in the appendant claims.

BRIEF DESCRIPTION OF THE DRAWINGS

The invention is described in greater detail hereinafter with reference to the drawings in which.

DETAILED DESCRIPTION OF THE INVENTION

Figure 1:
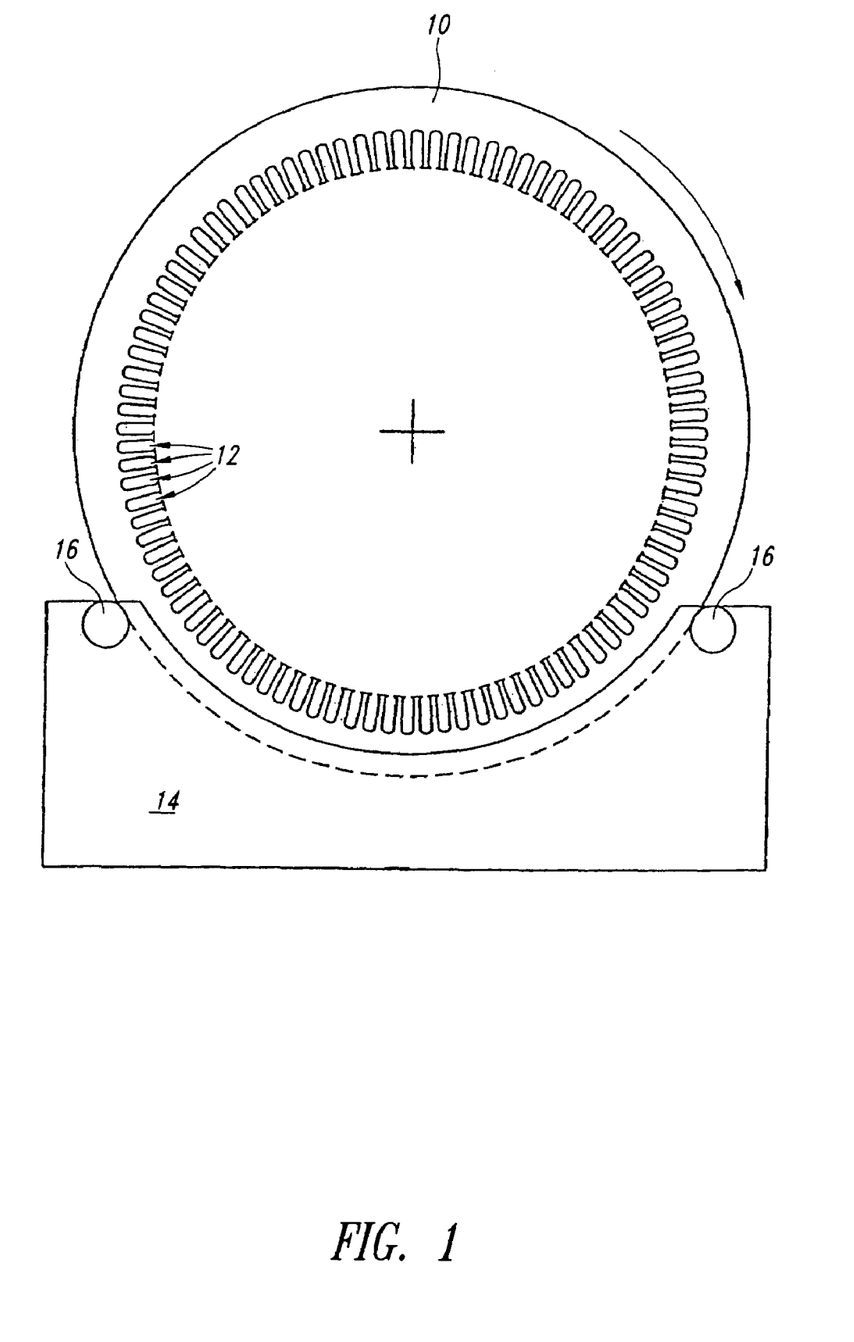
FIG. 1 is a simplified view of a stator of a ring generator in a holding apparatus.

In FIG. 1 reference numeral 10 denotes the stator which has grooves 12 extending in the axial direction at the inner periphery. That is the most frequent structural configuration of a generator. The rotor (not shown) is within the stator 10. That structural configuration is referred to as an internal rotor. Alternatively, in the case of a so-called external rotor in which the rotor encloses the stator 10, the grooves 12 can be provided at the outer periphery of the stator. The grooves 12 are shown on an enlarged scale in FIG. 3a. The stator 10 is held in a holding apparatus 14 which stands on the ground and thus holds the stator 10 and in particular the grooves 12 at a height which forms a working position which is favorable in terms of working physiology.

As such a stator 10 of a ring generator is of a diameter of several meters and accordingly is high in weight, the stator 10 is supported rotatably on rotary mountings 16 and can be rotated for example in the direction of the arrow by a desired amount in order to move the grooves 12 to be worked upon, into a desired position. It will be appreciated that this rotary movement of the stator 10 can also be produced by using a drive motor (not shown).

Figure 2:
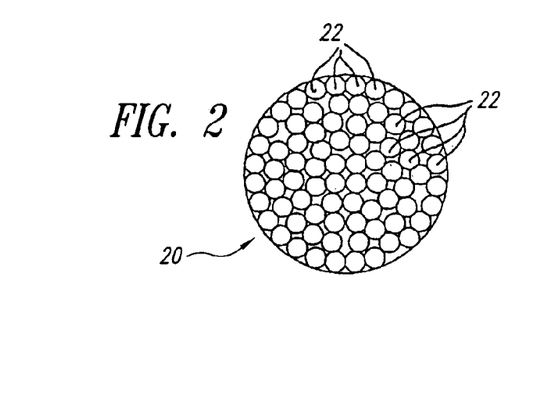
FIG. 2 is a view in cross-section through a conductor bundle.

FIG. 2 shows a conductor bundle 20 comprising a plurality of individual conductors 22 which are fitted in the form of a bundle into the grooves 12 of FIGS. 1 and 3. In this case the individual conductors 22 are insulated in relation to each other by a coating.

Forming conductor bundles 20 from individual conductors 22 has the advantage that those conductor bundles are not fixed in respect of their cross-sectional shape but are variable so that on the one hand they can be passed through a relatively narrow groove opening but on the other hand, by virtue of suitable deformation, they can fill the wider groove cross-section to the greatest possible extent in order to achieve a good filling factor for the groove 12 of FIGS. 1 and 3.

Figure 3A:
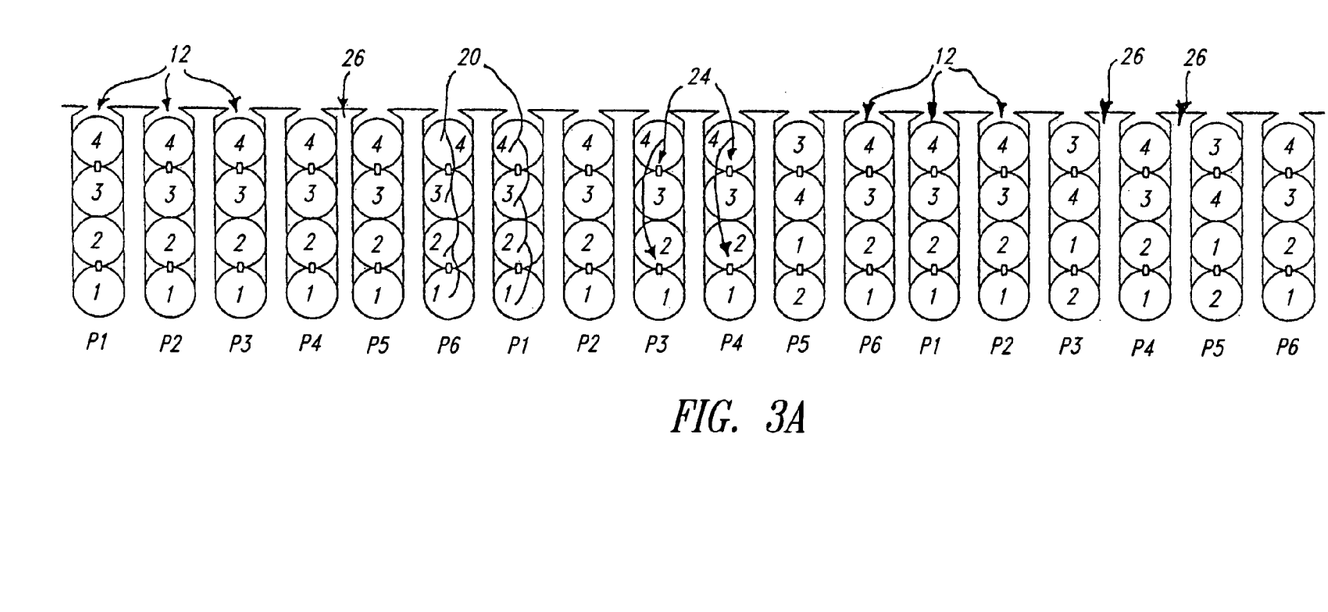
FIG. 3a shows a part of the stator grooves according to the invention with inserted conductor bundles.

FIG. 3a shows an unwound section of the inner periphery of the stator 10. Here, the grooves 12 are arranged horizontally one beside the other. Fitted into the grooves 12 are the conductor bundles which are shown here in simplified form as circular conductor bundles 20. Each two of those conductor bundles 20 are combined to form a turn of a phase. This is shown in FIG. 3a by arms 24 which connect a respective pair of the conductor bundles 20. Accordingly as shown in FIG. 3a, two turns of a phase are inserted into each groove. For greater ease of viewing the drawing, the individual conductor bundles are numbered by FIGS. 1–4 in an upward direction. In order to distinguish the individual phases of the six-phase system illustrated here, they are identified by the identifications P1–P6 beneath the groove.

It will be clearly seen from FIG. 3a that the conductor bundles 1 and 2 always form the first turn while the conductor bundles 3 and 4 always form the second turn which is inserted into the corresponding groove 12.

Beginning by looking at the left in FIG. 3a, the phases P1–P6 are shown in mutually juxtaposed relationship in a rising sequence and the succession of the conductor bundles is specified by references 4, 3, 2, 1. After the groove 12 with the phase P6, that phase sequence is repeated again beginning with P1. In the second groove 12 with the phase P5 illustrated in FIG. 3a the sequence of the conductor bundles 20 is now altered. The first turn arranged in the groove 12 at the bottom thereof still consists of the conductor bundles 1 and 2, but they are now interchanged in their sequence. Equally, the second turn still consists of the conductor bundles 20 identified at 3 and 4 but the sequence thereof is also interchanged. The phase P6 arranged therebeside again involves the succession of conductor bundles, which is already known.

The phases P1–P6 are shown once again in the right-hand part of FIG. 3a. In addition to the interchange of the conductor bundles 20 of the phase P5, which are identified by 1 and 2, and 3 and 4 respectively, in this case the conductor bundles of the phase P3 are also shown as being interchanged. It will be appreciated that, in this case also, the conductor bundles 20 identified by 1 and 2 form the first turn and the conductor bundles identified by 3 and 4 form the second turn of that phase, but it will be appreciated that within the turn, the position of the conductor bundles is again interchanged.

The reason for this interchange will be apparent if it is realized that the magnetic field lines extend not only in the longitudinal direction of the limbs 26 laterally delimiting the grooves 12, but also through the grooves between two limbs 26 of differing polarities. That results in a skin or current-displacement effect in the individual conductor bundles 20 in dependence on the position thereof in the groove 12.

If now the position of the conductor bundles is interchanged at given spacings, both conductor bundles 20 of a turn are correspondingly alternately subjected to that effect so that, with a suitable choice in respect of the interchange position and the frequency thereof, both conductor bundles 20 of a phase are subjected approximately uniformly to that effect so that no serious compensating currents resulting from non-uniform action flow and thus the maximum possible current can be delivered by the generator. A similar switching also occurs in other phases in subsequent phase series, not shown, but which can be easily understood from the description provided herein.

Figure 3B:
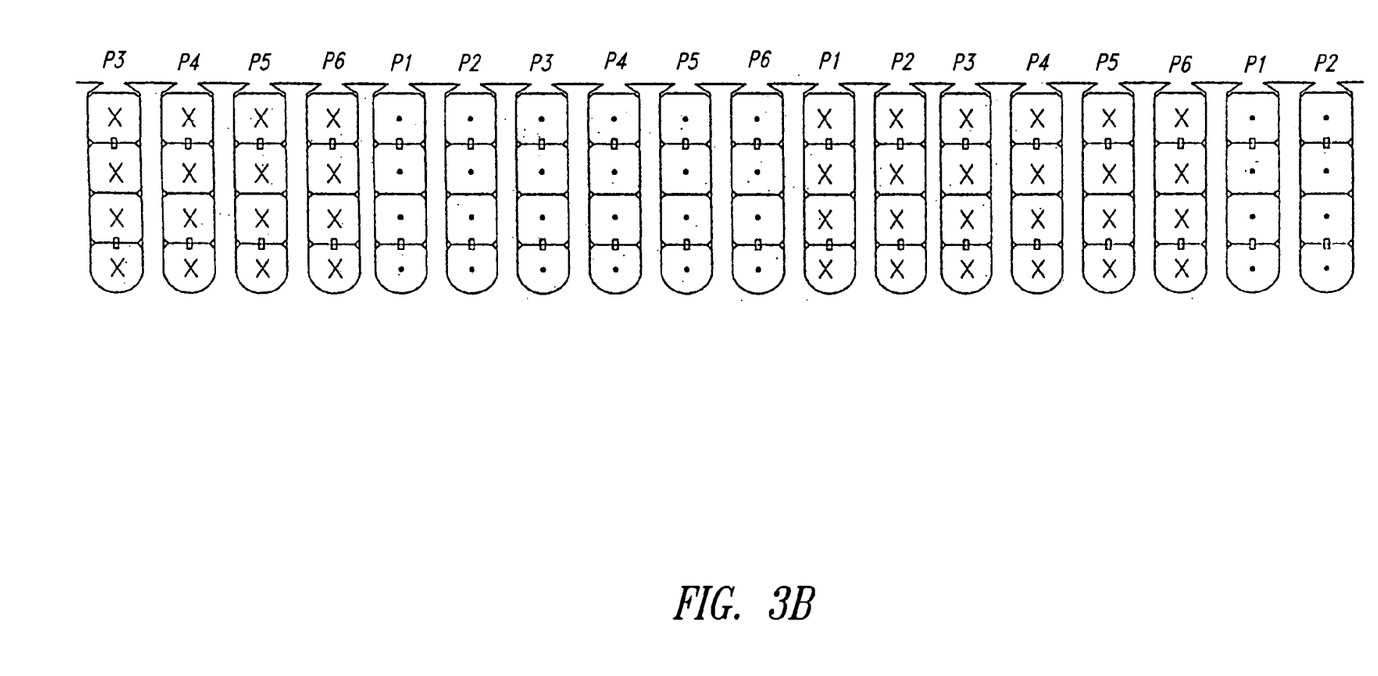
FIG. 3b shows a part of the stator grooves according to one alternative of the invention with inserted conductor bundles.

FIG. 3b therefore shows an illustration of the stator grooves with stator windings or stator conductors inserted therein, in which it can be seen that the stator grooves are very substantially filled with the windings and in which it is also possible to see the direction of current flow in the conductors (the arrow head and the arrow cross). In addition, the arrangement of the phases is altered in comparison with FIG. 3a in order also better to show the change in the direction of winding. The view in FIG. 3b however also makes it clear that more than 80% and preferably more than 95% of the total space of the stator groove is filled with windings and thus the proportion of air in the stator groove is extremely slight.

Figure 3C:
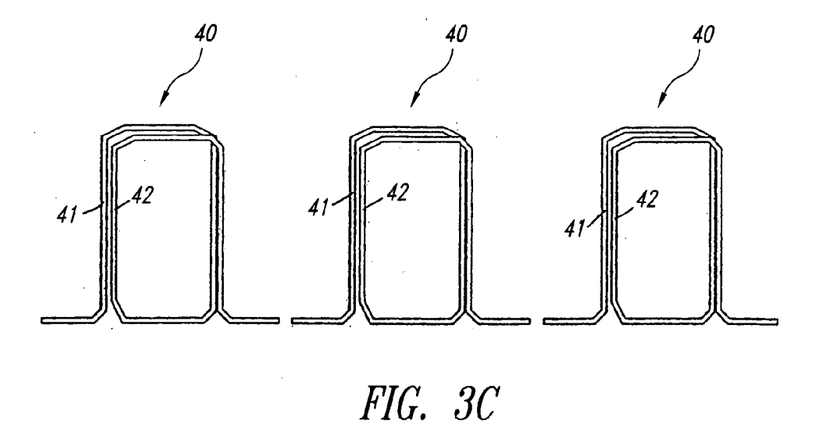
FIG. 3c shows a known structure of a stator winding.

FIG. 3c shows a part of a conventionally produced winding, although without illustrating the stator and the grooves in which the winding is inserted. In this case the winding is formed from former-wound coils 40 having two turns 41, 42. For the sake of improved clarity of the drawing those turns 41, 42 are shown in mutually displaced relationship. It will be appreciated that in the groove (not shown in FIG. 3c), they are arranged exactly one over the other.

FIG. 3c shows three former-wound coils 40 of a phase. The spacing arises out of the fact that arranged alternately between former-wound coils of this phase are former-wound coils of the other phases of the stator, but they are not shown in the Figure. The former-wound coils 40 of a phase can be connected to each other by solder connections or screw-clamp connections or similar devices.

Those connections which are shown in FIG. 3c are potential sources of trouble.

Figure 3D:
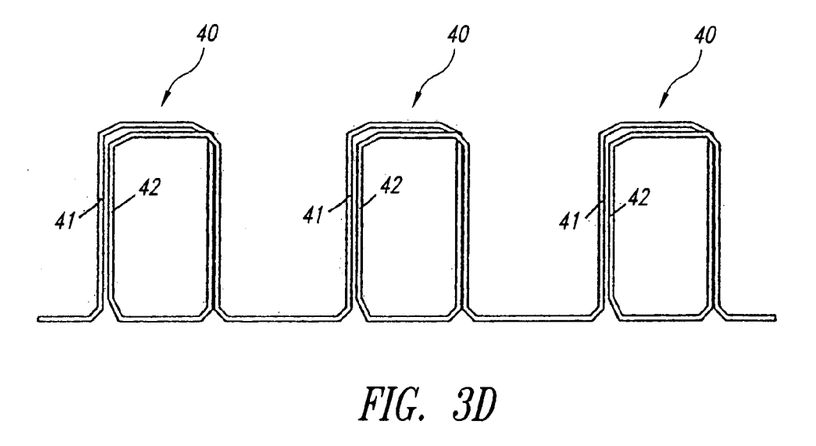
FIG. 3d shows a structure according to the invention of a stator winding.

FIG. 3d shows the configuration according to the invention of a phase which is wound continuously throughout. In this case also, corresponding to the view in FIG. 3b, FIG. 3d again shows a part of the winding of a phase. In this case the individual turns 41, 42 are also shown in mutually displaced relationship in order clearly to show the nature of the design.

It can be seen immediately in this embodiment that the transitions illustrated as potential sources of trouble in FIG. 3b are eliminated with this invention. Therefore, an interruption can no longer occur at the transitions between the individual winding portions.

Figure 4:
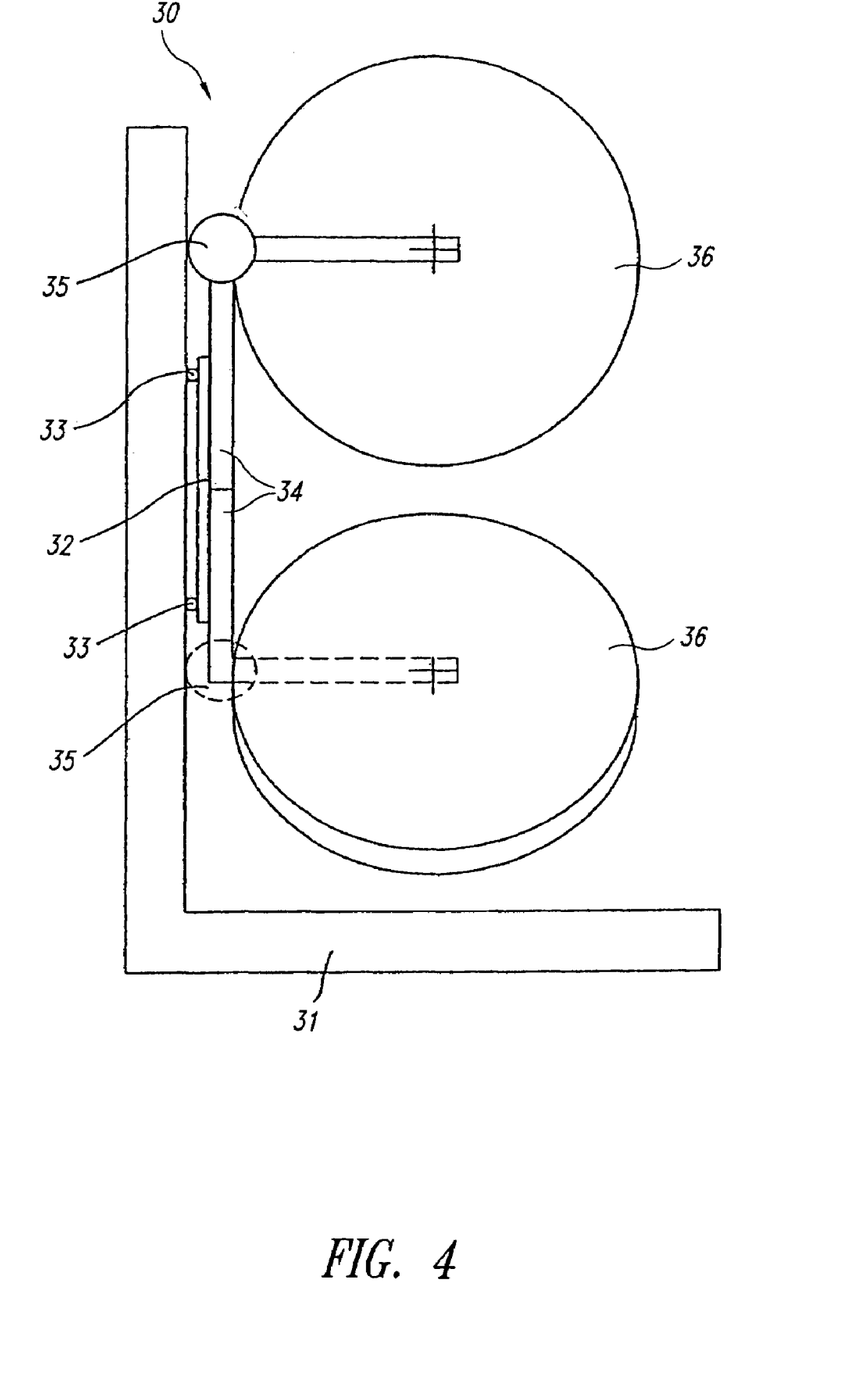
FIG. 4 is a simplified side view of the carrier apparatus according to the invention.

FIG. 4 shows a side view of a carrier apparatus 30 for the conductor bundles used as the winding wires. An L-shaped base frame 31 provides that the entire carrier apparatus 30 stands securely. A carrier plate 32 is connected to the base frame 31 by way of a rotary mounting 33. Fixed on the carrier plate 32 are carrier arms 34 which extend from the center of the carrier plate 32 a predetermined distance towards the periphery of the carrier plate 32 and which extend substantially horizontally away from the carrier plate 32 by a predetermined length.

Drums 36 with the conductor bundles used as the winding wire are rotatably fixed to those horizontally extending portions of the carrier arms 34.

A rotary mounting (not shown) is provided between the vertical portion of the carrier arm 34, which portion extends parallel to the carrier plate 32, and the horizontally extending portion of the carrier arm. That rotary mounting co-operates with a drive 35 and permits a rotary movement of the horizontal portion of the carrier arm 34 about its longitudinal axis together with the drum 36 arranged thereon. That makes it possible to counteract a twist effect which occurs upon winding of the stator winding between the conductor bundles of that winding.

Figure 5:
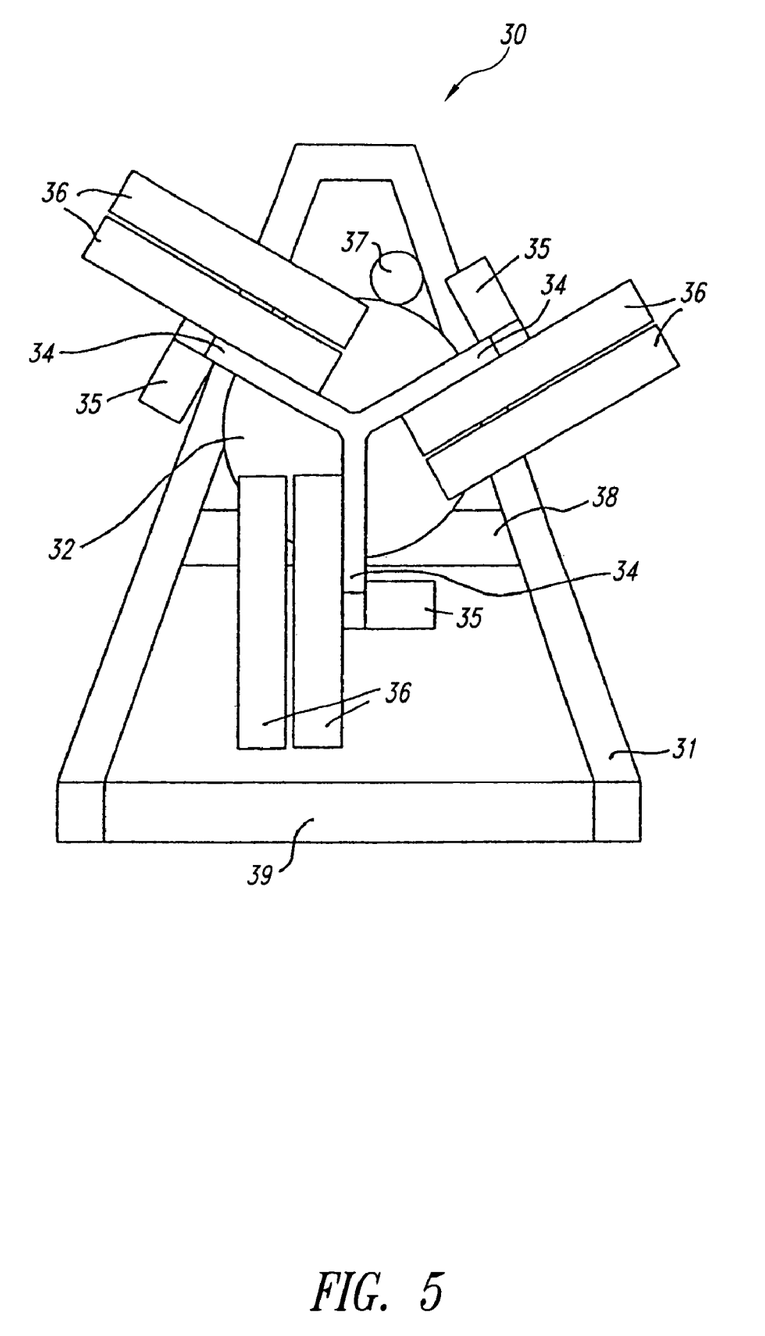
FIG. 5 is a front view of a carrier apparatus.

FIG. 5 shows a front view of that carrier apparatus 30. FIG. 5 shows a base frame 31 which tapers from the base towards the tip. Two transverse portions 38 and 39 are provided to enhance the stability of the structure.

The carrier plate 32 is arranged rotatably on the base frame 31. Arranged on the carrier plate 32 are three carrier arms 34 which are respectively displaced by the same angle (120°) and to the substantially horizontally extending cantilever portions of which are fixed two respective drums 36 for the conductor bundles. By virtue of the rotatable mounting of the carrier plate 32, with the drums 36 fixedly connected thereto by way of the carrier arms 34, the unit can be rotated by a second motor 37.

In the operation of producing the winding on the stator 10 each conductor bundle 20 is inserted into a groove 12, it is bent over at the end of the groove 12 in the winding head and it is passed to a new, parallel-extending groove 12 in the winding head. The conductor bundle 20 is then bent over again in such a way that it can be inserted into that groove 12. At the exit of that groove 12 the conductor bundle 20 is again bent over in the winding head in such a way that it can be passed to the next groove 12. It will be appreciated that a corresponding twist is also produced in the conductor bundle 20 which is passing to the drum 36.

The drums 36 are arranged in pairs on the horizontal portions of the carrier arms 34. As those horizontal portions are rotatable by the drives 35 about the longitudinal axis thereof, the drums 36 are also rotated. It is possible in that way to counteract a twist in the conductor bundles, by rotation of the corresponding carrier arm 34.

A second drive 37 is arranged between the base frame 31 and the carrier plate 32 and permits rotation of the carrier plate 32 with all carrier arms 34 disposed thereon and the drums 36 in order also to implement rotation of the stator 10 in the stator holder 14 and in that way to avoid twisting of the conductor bundles.

Figure 6:
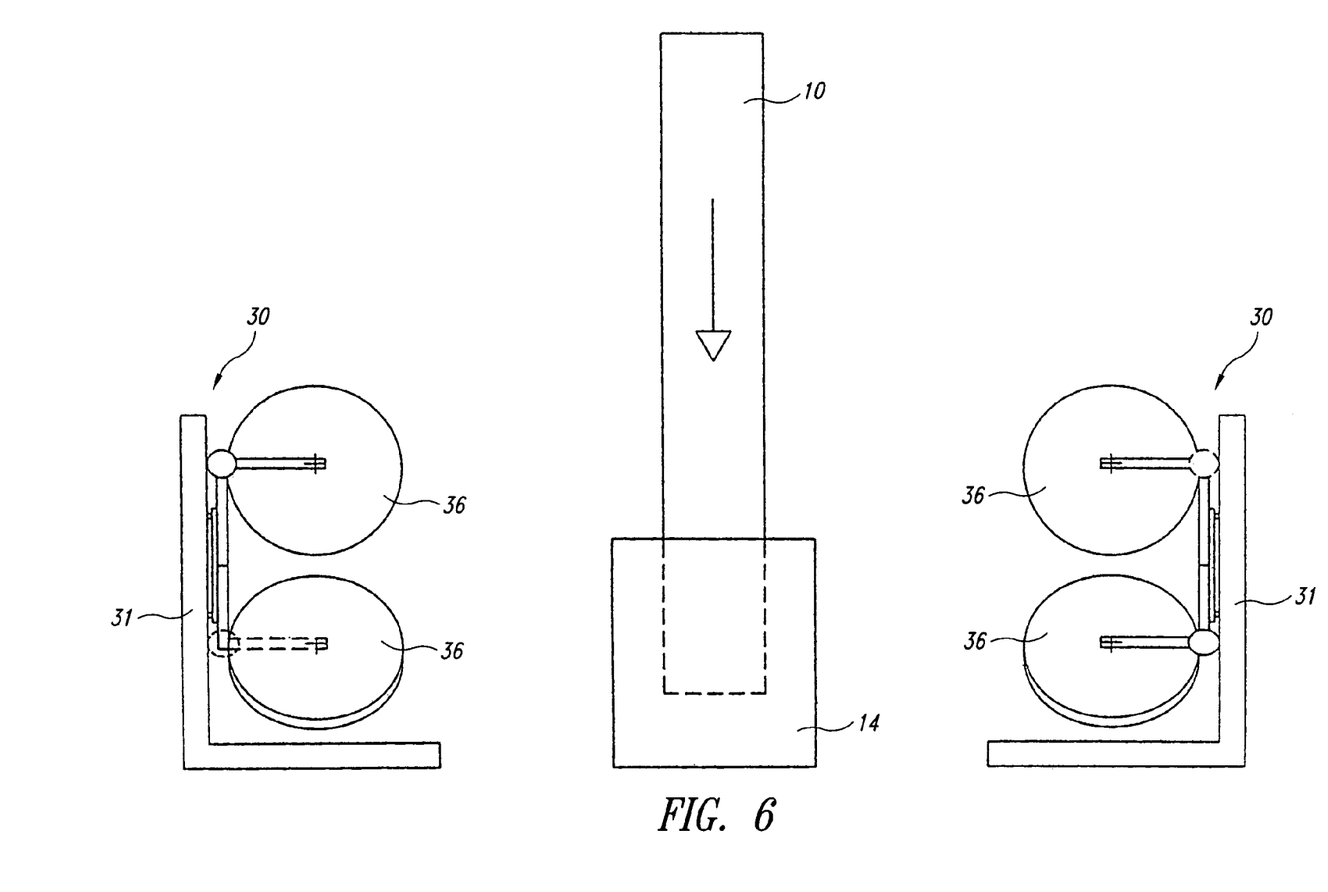
FIG. 6 shows the arrangement of carrier apparatuses and stator for the production of a stator winding according to the invention.

FIG. 6 shows in simplified form and without a conductor bundle between the carrier apparatuses 30 and the stator 10 the arrangement of two carrier apparatuses 30 and a stator 10 to be wound. The stator 10 is stored in a holding apparatus 14 and is rotatable in the peripheral direction (the direction of the arrow). As each of the carrier apparatuses 30 also has rotatably supported drums 36, they can also perform or implement the rotary movement of the stator by virtue of a corresponding rotary movement. Therefore, the provision of two carrier apparatuses 30 each with three pairs of drums means that it is possible for six phases to be wound simultaneously on a stator.

It will be apparent that the present invention can be applied not only to ring generators for wind power installations but basically to any synchronous machine, in which respect it must be made clear that this does not involve very small-scale machines but machines which involve a considerable spatial extent and which usually have connected loads of under some circumstances several 100 kW and more. For a ring generator of a wind power installation for example a rated output of more than 500 kW is typical, even generators with a rated output of more than 4 MW have already been tested and will be used in the future. Just the stator alone of the described synchronous machine weighs several tons, while in the case of ring generators of over 4 MW, under some circumstances it weighs even more than 50 tons.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation having a ring generator which has a stator in which grooves are provided at an inner or outer periphery in mutually spaced relationship to receive a stator winding, wherein the winding is wound without interruption continuously throughout, wherein the winding of a phase includes at least one conductor bundle, wherein a conductor bundle includes a plurality of mutually insulated conductors, and wherein the stator has 6-phase windings that are each wound without interruption continuously, wherein at least two conductor bundles are arranged in mutually superposed relationship in a groove, wherein, in grooves in which a plurality of conductor bundles are arranged, positions of upper and lower conductor bundles are interchanged in a predetermined order, and wherein the conductor bundles in the grooves are arranged in a rising sequence of the phases of the conductor bundles, said rising sequence of phases including at least one phase in which said upper and lower conductor bundles are interchanged, and wherein the stator is a plurality of meters in diameter and wherein the generator has a rated output of a plurality of 100 kW.

2. The wind power installation according to claim 1 wherein only respective windings of a phase are arranged within a groove.

3. The wind power installation according to claim 1 wherein groove windings of different phases are arranged in adjacent relationship.

4. The wind power installation according to claim 1 wherein inserted into each groove are two turns which correspond to a same phase.

5. The wind power installation according to claim 1 wherein each conductor is insulated by a coating.

6. The wind power installation according to claim 1 wherein said rated output is more than 500 kW.

7. The wind power installation according to claim 1 wherein said rated output is more than 4 MW.

8. The wind power installation according to claim 1 wherein said stator is a plurality of tons in weight.

9. The wind power installation according to claim 8 wherein said stator is over 50 tons in weight.

10. The wind power installation according to claim 1 wherein in other ones of said grooves, said position of said upper and lower conductor bundles are not interchanged.

11. A ring generator for a wind power installation, the ring generator comprising:

a stator in which grooves are provided at a periphery in mutually spaced relationship to each receive a stator winding, wherein the stator has 6-phase windings that are each wound without interruption continuously throughout; and a rotor, wherein the stator is secured fixedly to a machine carrier of the wind power installation, wherein the rotor of the ring generator is coupled to a rotor of the wind power installation, wherein, in grooves in which a plurality of conductor bundles are arranged, positions of upper and lower conductor bundles are interchanged in a predetermined order, and wherein the conductor bundles in the grooves are arranged in a rising sequence of the phases of the conductor bundles, said rising sequence of phases including at least one phase in which said upper and lower conductor bundles are interchanged, and wherein the stator is a plurality of meters in diameter and wherein the generator has a rated output of a plurality of 100 kW.

12. The ring generator of claim 11 wherein the winding of a phase includes at least one conductor bundle, wherein a conductor bundle includes a plurality of mutually insulated conductors, and wherein at least two conductor bundles are arranged in mutually superposed relationship in a groove.

13. The ring generator of claim 12 wherein each conductor is insulated by a coating.

14. The ring generator of claim 11 wherein said rated output is more than 500 kW.

15. The ring generator of claim 11 wherein said rated output is more than 4 MW.

16. The ring generator of claim 11 wherein said stator is a plurality of tons is weight.

17. The ring generator of claim 16 wherein said stator is over 50 tons in weight.

18. The ring generator of claim 11 wherein in other ones of said grooves, said position of said upper and lower conductor bundles are not interchanged.

* * * * *